US012273466B2

United States Patent
Eom et al.

(10) Patent No.: US 12,273,466 B2
(45) Date of Patent: Apr. 8, 2025

(54) ELECTRONIC AUTHENTICATION SYSTEM AND METHOD OF SUPPORTING MULTI-SIGNATURE

(71) Applicant: AIoT Holdings Inc., Seoul (KR)

(72) Inventors: Hyeon Sang Eom, Seoul (KR); Jong Been Han, Seoul (KR); Gi Hoon Kang, Yongin-si (KR); Min Suk Kim, Seoul (KR)

(73) Assignee: AIoT Holdings Inc., Seoul (KR)

( * ) Notice: Subject to any disclaimer, the term of this patent is extended or adjusted under 35 U.S.C. 154(b) by 206 days.

(21) Appl. No.: 17/822,520

(22) Filed: Aug. 26, 2022

(65) Prior Publication Data

US 2023/0060347 A1 Mar. 2, 2023

(30) Foreign Application Priority Data

Aug. 26, 2021 (KR) .......................... 10-2021-0113306

(51) Int. Cl.
*H04L 9/32* (2006.01)
*H04L 9/08* (2006.01)
*H04L 9/30* (2006.01)

(52) U.S. Cl.
CPC .......... *H04L 9/3255* (2013.01); *H04L 9/0825* (2013.01); *H04L 9/0827* (2013.01);
(Continued)

(58) Field of Classification Search
None
See application file for complete search history.

(56) References Cited

U.S. PATENT DOCUMENTS

| 4,914,698 A | * | 4/1990 | Chaum | ................... H04L 9/302 713/180 |
| 4,926,480 A | * | 5/1990 | Chaum | ............ G06Q 20/40975 235/382 |

(Continued)

FOREIGN PATENT DOCUMENTS

| CN | 108476139 A | * | 8/2018 | ............. G06F 21/62 |
| WO | WO-2019194803 A1 | * | 10/2019 | ........... G06Q 20/065 |

OTHER PUBLICATIONS

Van Der Merwe et al "A Public Key Management Scheme and Threshold-Multisignature Scheme for Mobile Ad Hoc Networks," South African Institute of Electrical Engineers, pp. 82-92 (Year: 2006).*

(Continued)

*Primary Examiner* — Luu T Pham
*Assistant Examiner* — James J Wilcox
(74) *Attorney, Agent, or Firm* — Studebaker Brackett PLLC (57) ABSTRACT

Disclosed is an electronic authentication system and method of supporting multi-signature. The method includes: designating a user group including a plurality of users to participate in multi-signature; further including a virtual user in the user group according to a predetermined policy or a request of one or two or more users of the plurality of users; generating a communication channel for communication with the user group; receiving a public key for each user of the user group through the communication channel, and sharing the received public key with the user or virtual user of the user group; and sharing a local signature generated by the user of the user group through the communication channel.

7 Claims, 7 Drawing Sheets

(52) U.S. Cl.
CPC .............. *H04L 9/30* (2013.01); *H04L 9/3252* (2013.01); *H04L 9/3297* (2013.01)

(56) References Cited

U.S. PATENT DOCUMENTS

| | | | | |
|---|---|---|---|---|
| 4,996,711 | A * | 2/1991 | Chaum | H04L 9/3271 713/180 |
| 5,016,274 | A * | 5/1991 | Micali | G06Q 20/341 713/180 |
| 5,537,475 | A * | 7/1996 | Micali | H04L 9/3255 713/180 |
| 5,588,061 | A * | 12/1996 | Ganesan | H04L 9/3249 713/180 |
| 5,610,982 | A * | 3/1997 | Micali | H04L 9/3255 713/180 |
| 5,799,088 | A * | 8/1998 | Raike | H04L 9/3093 380/46 |
| 5,825,880 | A * | 10/1998 | Sudia | G06F 21/64 713/180 |
| 5,867,578 | A * | 2/1999 | Brickell | H04L 9/3265 713/180 |
| 5,905,799 | A * | 5/1999 | Ganesan | H04L 9/302 380/279 |
| 6,038,317 | A * | 3/2000 | Magliveras | H04L 9/302 380/37 |
| 6,088,454 | A * | 7/2000 | Nagashima | H04L 9/3255 713/180 |
| 6,151,676 | A * | 11/2000 | Cuccia | H04L 9/3247 380/278 |
| 6,154,841 | A * | 11/2000 | Oishi | H04L 9/3255 713/180 |
| 6,298,153 | B1 * | 10/2001 | Oishi | H04L 9/3013 380/45 |
| 6,341,349 | B1 * | 1/2002 | Takaragi | H04L 9/3066 713/168 |
| 6,446,207 | B1 * | 9/2002 | Vanstone | H04L 9/3066 713/180 |
| 7,020,282 | B1 * | 3/2006 | Chang | H04L 9/302 713/171 |
| 7,526,651 | B2 * | 4/2009 | Arditti Modiano | H04L 9/3255 713/180 |
| 7,607,019 | B2 * | 10/2009 | Crandall | H04L 9/3271 713/180 |
| 7,890,763 | B1 * | 2/2011 | Law | H04L 9/3247 713/157 |
| 7,986,778 | B2 * | 7/2011 | Harrison | H04L 9/3073 380/30 |
| 8,151,332 | B2 * | 4/2012 | Cross | H04L 9/14 713/168 |
| 8,316,237 | B1 * | 11/2012 | Felsher | H04L 63/061 380/282 |
| 8,826,025 | B2 * | 9/2014 | Sakumoto | H04L 9/3221 713/176 |
| 8,959,355 | B2 * | 2/2015 | Sakumoto | H04L 9/3093 713/176 |
| 9,129,122 | B2 * | 9/2015 | Sakumoto | H04L 9/3093 |
| 9,160,972 | B2 * | 10/2015 | Yoshioka | H04L 9/3236 |
| 9,401,811 | B2 * | 7/2016 | Asim | H04L 9/3073 |
| 9,455,832 | B2 * | 9/2016 | Brown | H04L 9/3242 |
| 9,690,845 | B2 * | 6/2017 | Araki | G06F 16/901 |
| 10,057,243 | B1 * | 8/2018 | Kumar | H04L 9/0891 |
| 10,250,395 | B1 * | 4/2019 | Borne-Pons | H04L 9/3247 |
| 10,505,723 | B1 * | 12/2019 | Griffin | H04L 9/085 |
| 10,608,824 | B1 * | 3/2020 | Praus | H04L 9/083 |
| 10,630,467 | B1 * | 4/2020 | Gilbert | H04L 9/14 |
| 10,630,655 | B2 * | 4/2020 | Becker | H04L 9/008 |
| 10,685,353 | B2 * | 6/2020 | Burke | H04L 9/302 |
| 10,735,205 | B1 * | 8/2020 | Wentz | H04L 9/3257 |
| 10,740,474 | B1 * | 8/2020 | Ghetti | H04L 9/3066 |
| 10,790,976 | B1 * | 9/2020 | Raevsky | G06Q 20/065 |
| 10,887,113 | B2 * | 1/2021 | Queralt | H04L 9/3268 |
| 10,951,417 | B2 * | 3/2021 | Qi | G06F 16/2365 |
| 10,992,469 | B2 * | 4/2021 | Cheng | H04L 9/0897 |
| 11,102,204 | B1 * | 8/2021 | Jacques de Kadt | H04L 9/3239 |
| 11,133,942 | B1 * | 9/2021 | Griffin | H04L 9/3255 |
| 11,204,996 | B2 * | 12/2021 | Permeh | G06F 21/554 |
| 11,228,446 | B2 * | 1/2022 | Wang | G06F 16/9035 |
| 11,238,447 | B2 * | 2/2022 | Zhang | G06Q 20/3829 |
| 11,239,996 | B2 * | 2/2022 | Masters | G06F 21/602 |
| 11,263,605 | B2 * | 3/2022 | Chalkias | H04L 9/30 |
| 11,290,273 | B2 * | 3/2022 | Ding | H04L 9/3093 |
| 11,316,662 | B2 * | 4/2022 | Qu | H04L 9/083 |
| 11,372,986 | B1 * | 6/2022 | Doherty | H04L 9/30 |
| 11,398,916 | B1 * | 7/2022 | Griffin | H04L 9/3255 |
| 11,411,738 | B2 * | 8/2022 | Agrawal | H04L 9/3218 |
| 11,418,347 | B1 * | 8/2022 | Griffin | H04L 9/30 |
| 11,477,006 | B2 * | 10/2022 | Williams | G06F 16/3344 |
| 11,588,645 | B1 * | 2/2023 | Yavuz | H04L 9/14 |
| 11,770,260 | B1 * | 9/2023 | Pamucci | H04N 21/8358 |
| 11,836,688 | B1 * | 12/2023 | Lawrence | G06F 21/31 |
| 11,887,072 | B2 * | 1/2024 | Ornelas | G06Q 40/02 |
| 11,954,672 | B1 * | 4/2024 | Hamera | H04L 9/3247 |
| 12,082,276 | B1 * | 9/2024 | Guild | H04L 9/30 |
| 2002/0013898 | A1 * | 1/2002 | Sudia | G06Q 20/3829 380/278 |
| 2002/0108044 | A1 * | 8/2002 | Miyazaki | H04L 9/3255 713/180 |
| 2002/0152389 | A1 * | 10/2002 | Horita | H04L 9/0836 713/180 |
| 2003/0177352 | A1 * | 9/2003 | Camenisch | H04L 9/3218 713/158 |
| 2004/0073814 | A1 * | 4/2004 | Miyazaki | H04L 9/3271 726/6 |
| 2004/0111607 | A1 * | 6/2004 | Yellepeddy | H04L 63/0823 713/155 |
| 2004/0123110 | A1 * | 6/2004 | Zhang | H04L 9/3073 713/176 |
| 2005/0022102 | A1 * | 1/2005 | Gentry | H04L 9/3073 715/255 |
| 2005/0076215 | A1 * | 4/2005 | Dryer | G06F 40/166 713/176 |
| 2005/0152542 | A1 * | 7/2005 | Zheng | H04L 9/3213 380/30 |
| 2005/0201561 | A1 * | 9/2005 | Komano | H04L 9/3249 380/255 |
| 2005/0262353 | A1 * | 11/2005 | Gentry | H04L 9/3247 713/176 |
| 2005/0262354 | A1 * | 11/2005 | Komano | H04L 9/3255 713/177 |
| 2006/0010079 | A1 * | 1/2006 | Brickell | H04L 9/3221 705/67 |
| 2006/0104447 | A1 * | 5/2006 | Lauter | H04L 9/0841 380/258 |
| 2006/0140400 | A1 * | 6/2006 | Brown | H04L 9/3066 380/30 |
| 2006/0155985 | A1 * | 7/2006 | Canard | H04L 63/0823 713/156 |
| 2006/0159259 | A1 * | 7/2006 | Gentry | H04L 9/0643 380/42 |
| 2006/0159269 | A1 * | 7/2006 | Braun | H04L 9/14 380/277 |
| 2006/0177051 | A1 * | 8/2006 | Lauter | H04L 9/3247 713/181 |
| 2006/0215837 | A1 * | 9/2006 | Chen | H04L 9/3013 380/44 |
| 2006/0236098 | A1 * | 10/2006 | Gantman | H04L 63/0823 713/158 |
| 2006/0248338 | A1 * | 11/2006 | Jao | H04L 9/321 713/176 |
| 2006/0280308 | A1 * | 12/2006 | Anshel | H04L 9/0869 380/46 |
| 2007/0028114 | A1 * | 2/2007 | McCullagh | H04L 9/3073 713/176 |
| 2007/0121933 | A1 * | 5/2007 | Futa | H04L 9/3066 380/1 |
| 2007/0143608 | A1 * | 6/2007 | Zeng | H04L 9/3218 713/168 |
| 2007/0165843 | A1 * | 7/2007 | Lauter | H04L 9/3073 380/30 |

(56) References Cited

U.S. PATENT DOCUMENTS

| | | | |
|---|---|---|---|
| 2007/0168672 A1* | 7/2007 | Izu | H04L 9/3073 713/176 |
| 2007/0198840 A1* | 8/2007 | Lee | H04L 63/12 713/176 |
| 2008/0069347 A1* | 3/2008 | Brown | H04L 9/3066 380/45 |
| 2008/0089514 A1* | 4/2008 | Futa | H04L 9/3093 380/44 |
| 2008/0152132 A1* | 6/2008 | Sung | H04L 9/3013 380/44 |
| 2008/0155265 A1* | 6/2008 | Yi | H04L 9/302 713/180 |
| 2008/0178005 A1* | 7/2008 | Gentry | H04L 9/3255 713/176 |
| 2008/0181413 A1* | 7/2008 | Yi | H04L 9/302 380/279 |
| 2008/0226066 A1* | 9/2008 | Yi | H04L 9/14 380/47 |
| 2008/0270786 A1* | 10/2008 | Brickell | H04L 9/3255 713/180 |
| 2008/0270790 A1* | 10/2008 | Brickell | G06F 21/57 713/176 |
| 2009/0019285 A1* | 1/2009 | Chen | G06F 21/575 713/175 |
| 2009/0034739 A1* | 2/2009 | Teranishi | H04L 9/0833 380/278 |
| 2009/0044017 A1* | 2/2009 | Teranishi | H04L 9/3249 713/176 |
| 2009/0089575 A1* | 4/2009 | Yonezawa | G06Q 10/06 380/44 |
| 2009/0112956 A1* | 4/2009 | Cheon | G06F 7/724 708/207 |
| 2009/0129600 A1* | 5/2009 | Brickell | H04L 9/3234 380/282 |
| 2009/0180612 A1* | 7/2009 | Leu | H04N 21/2396 725/114 |
| 2009/0222668 A1* | 9/2009 | Zaccone | H04L 9/0833 380/279 |
| 2009/0276630 A1* | 11/2009 | Teranishi | H04L 9/3255 380/282 |
| 2010/0023771 A1* | 1/2010 | Struik | H04L 9/3252 713/171 |
| 2010/0180119 A1* | 7/2010 | Furukawa | H04L 9/0844 713/180 |
| 2010/0217710 A1* | 8/2010 | Fujita | H04L 9/3263 705/30 |
| 2010/0235727 A1* | 9/2010 | Ashton | H04L 9/3255 715/253 |
| 2010/0308978 A1* | 12/2010 | Brown | H04L 9/3213 340/10.42 |
| 2011/0016325 A1* | 1/2011 | Futa | H04L 9/3093 713/179 |
| 2011/0040960 A1* | 2/2011 | Deierling | G06F 21/572 711/163 |
| 2011/0093210 A1* | 4/2011 | Matsuzaki | G16H 40/67 713/180 |
| 2011/0154025 A1* | 6/2011 | Spalka | H04L 9/3236 713/182 |
| 2011/0154045 A1* | 6/2011 | Lee | H04L 9/3255 713/176 |
| 2011/0173455 A1* | 7/2011 | Spalka | H04L 9/0869 713/189 |
| 2012/0084567 A1* | 4/2012 | Hwang | H04L 9/3255 713/176 |
| 2012/0159153 A1* | 6/2012 | Shim | H04L 9/0847 713/155 |
| 2012/0239567 A1* | 9/2012 | Choi | G06Q 20/349 705/41 |
| 2012/0324240 A1* | 12/2012 | Hattori | G06F 21/6227 713/189 |
| 2013/0010950 A1* | 1/2013 | Kerschbaum | H04L 9/3218 380/30 |
| 2013/0073860 A1* | 3/2013 | Ibraimi | H04L 9/085 713/176 |
| 2013/0080771 A1* | 3/2013 | Brickell | H04L 9/3234 713/176 |
| 2013/0091360 A1* | 4/2013 | Hwang | H04L 9/3255 713/176 |
| 2013/0097420 A1* | 4/2013 | Zaverucha | H04L 9/3252 713/156 |
| 2013/0129090 A1* | 5/2013 | Kipnis | H04L 9/3093 380/255 |
| 2013/0179675 A1* | 7/2013 | Yoshida | H04L 9/30 713/150 |
| 2013/0179951 A1* | 7/2013 | Broustis | H04L 9/0841 726/6 |
| 2013/0212393 A1* | 8/2013 | D'Souza | H04L 9/0891 713/171 |
| 2013/0212395 A1* | 8/2013 | D'Souza | H04L 9/08 713/171 |
| 2013/0287206 A1* | 10/2013 | Hattori | H04L 9/3073 380/30 |
| 2014/0050318 A1* | 2/2014 | Hayashi | H04L 9/3073 380/46 |
| 2014/0098960 A1* | 4/2014 | Xu | H04L 9/0819 380/278 |
| 2014/0164765 A1* | 6/2014 | Hernandez | H04L 9/3255 713/156 |
| 2014/0164780 A1* | 6/2014 | Sakumoto | H04L 9/3093 713/176 |
| 2014/0173281 A1* | 6/2014 | Hwang | H04L 9/3255 713/171 |
| 2014/0208104 A1* | 7/2014 | Yoon | H04L 9/3247 713/168 |
| 2014/0237252 A1* | 8/2014 | Hursti | H04L 9/30 713/176 |
| 2015/0012738 A1* | 1/2015 | Shah | G06F 21/74 713/2 |
| 2015/0180661 A1* | 6/2015 | Fujii | H04L 9/30 380/46 |
| 2015/0222604 A1* | 8/2015 | Ylonen | H04L 9/3263 713/171 |
| 2015/0358167 A1* | 12/2015 | Wang | H04L 63/0281 713/176 |
| 2016/0072623 A1* | 3/2016 | Joye | H04L 9/3255 380/28 |
| 2016/0105287 A1* | 4/2016 | Joye | H04L 9/3013 713/176 |
| 2016/0127128 A1* | 5/2016 | Chen | H04L 9/0897 713/189 |
| 2016/0226665 A1* | 8/2016 | Wuidart | H04W 12/069 |
| 2016/0255056 A1* | 9/2016 | Shalunov | H04L 63/0428 713/168 |
| 2016/0292680 A1* | 10/2016 | Wilson, Jr. | H04L 63/0428 |
| 2016/0306966 A1* | 10/2016 | Srivastava | H04L 9/30 |
| 2016/0373260 A1* | 12/2016 | Jerkeby | H04L 9/30 |
| 2016/0380767 A1* | 12/2016 | Hayashi | H04L 9/14 380/45 |
| 2016/0380768 A1* | 12/2016 | Koike | H04L 9/30 380/277 |
| 2017/0083717 A1* | 3/2017 | Medvedev | H04L 63/0428 |
| 2017/0091750 A1* | 3/2017 | Maim | H04L 9/14 |
| 2017/0154331 A1* | 6/2017 | Voorhees | H04L 9/3255 |
| 2017/0213041 A1* | 7/2017 | Medvedev | G06F 21/602 |
| 2017/0244567 A1* | 8/2017 | Smeets | H04L 9/3268 |
| 2017/0277911 A1* | 9/2017 | Boldyrev | H04L 63/0823 |
| 2017/0302457 A1* | 10/2017 | Nakamoto | H04L 9/30 |
| 2017/0317833 A1* | 11/2017 | Smith | H04L 63/0442 |
| 2017/0317834 A1* | 11/2017 | Smith | H04L 9/3239 |
| 2017/0344758 A1* | 11/2017 | Matsuo | H04L 9/30 |
| 2017/0344987 A1* | 11/2017 | Davis | G06F 16/24575 |
| 2017/0357496 A1* | 12/2017 | Smith | H04L 9/0662 |
| 2017/0366358 A1* | 12/2017 | Lyubashevsky | H04L 9/3221 |
| 2018/0026796 A1* | 1/2018 | Oberheide | H04L 9/3226 713/176 |
| 2018/0026799 A1* | 1/2018 | Pottier | H04L 9/30 713/156 |
| 2018/0054316 A1* | 2/2018 | Tomlinson | H04L 9/3242 |
| 2018/0068280 A1* | 3/2018 | Micali | G06Q 20/29 |

(56) References Cited

U.S. PATENT DOCUMENTS

| | | | |
|---|---|---|---|
| 2018/0082050 A1* | 3/2018 | Flink | H04L 9/3228 |
| 2018/0097638 A1* | 4/2018 | Haldenby | H04W 12/0433 |
| 2018/0101684 A1* | 4/2018 | Murphy | G06F 21/64 |
| 2018/0101842 A1* | 4/2018 | Ventura | G06Q 10/087 |
| 2018/0139056 A1* | 5/2018 | Imai | H04L 9/14 |
| 2018/0144233 A1* | 5/2018 | Chen | G06K 19/06009 |
| 2018/0191503 A1* | 7/2018 | Alwar | H04L 9/3242 |
| 2018/0198627 A1* | 7/2018 | Mullins | H04L 9/3066 |
| 2018/0198629 A1* | 7/2018 | Deymonnaz | H04L 9/0894 |
| 2018/0278426 A1* | 9/2018 | Tang | H04L 9/083 |
| 2018/0307573 A1* | 10/2018 | Abraham | G06F 11/1479 |
| 2018/0316495 A1* | 11/2018 | Wall | H04L 9/3073 |
| 2018/0331824 A1* | 11/2018 | Racz | G08B 13/19667 |
| 2018/0331832 A1* | 11/2018 | Pulsifer | H04L 9/3247 |
| 2018/0343126 A1* | 11/2018 | Fallah | H04L 9/3297 |
| 2019/0013943 A1* | 1/2019 | Maim | G06Q 20/3678 |
| 2019/0013950 A1* | 1/2019 | Becker | H04L 9/0618 |
| 2019/0020486 A1* | 1/2019 | Hoffstein | H04L 9/3247 |
| 2019/0037469 A1* | 1/2019 | Krishnan | G06F 3/048 |
| 2019/0044732 A1* | 2/2019 | Reinders | H04L 9/3073 |
| 2019/0052461 A1* | 2/2019 | Kreder, III | G06F 21/75 |
| 2019/0068567 A1* | 2/2019 | Bhatnagar | H04L 9/321 |
| 2019/0108109 A1* | 4/2019 | Ghosh | H04L 9/004 |
| 2019/0114860 A1* | 4/2019 | Eckelmann-Wendt | H04L 9/3247 |
| 2019/0132138 A1* | 5/2019 | Finlow-Bates | H04L 9/34 |
| 2019/0149334 A1* | 5/2019 | Van Der Velden | H04L 9/0877 713/185 |
| 2019/0163911 A1* | 5/2019 | Kliewer | H04L 9/30 |
| 2019/0188702 A1* | 6/2019 | Bolla | G06Q 20/3829 |
| 2019/0205873 A1* | 7/2019 | Kamalsky | H04L 9/3239 |
| 2019/0236726 A1* | 8/2019 | Unagami | G06Q 20/3829 |
| 2019/0260715 A1* | 8/2019 | Suzuki | H04L 9/0618 |
| 2019/0273607 A1* | 9/2019 | Van Der Velden | H04L 9/088 |
| 2019/0295050 A1* | 9/2019 | Chalkias | G06Q 20/3829 |
| 2019/0305962 A1* | 10/2019 | Takemori | H04L 9/3234 |
| 2019/0318356 A1* | 10/2019 | Martin | H04L 9/0637 |
| 2019/0319798 A1* | 10/2019 | Chalkias | H04L 9/3236 |
| 2019/0327096 A1* | 10/2019 | Liu | H04L 9/30 |
| 2019/0334715 A1* | 10/2019 | Gray | H04L 9/30 |
| 2019/0354968 A1* | 11/2019 | Sato | G06Q 20/3825 |
| 2019/0372781 A1* | 12/2019 | Ra | H04L 9/3239 |
| 2020/0008095 A1* | 1/2020 | Patil | H04W 12/03 |
| 2020/0014531 A1* | 1/2020 | Falco | H04L 63/0884 |
| 2020/0014546 A1* | 1/2020 | Karame | G06F 21/57 |
| 2020/0027080 A1* | 1/2020 | Holland | G06Q 20/36 |
| 2020/0044863 A1* | 2/2020 | Yadlin | G06F 9/54 |
| 2020/0053054 A1* | 2/2020 | Ma | H04L 9/3239 |
| 2020/0076586 A1* | 3/2020 | Zhang | H04L 9/0833 |
| 2020/0076620 A1* | 3/2020 | Ogura | H04L 9/3268 |
| 2020/0084042 A1* | 3/2020 | Nelson | H04L 9/0894 |
| 2020/0084049 A1* | 3/2020 | Lindell | H04L 9/085 |
| 2020/0084483 A1* | 3/2020 | Brown | G06Q 20/405 |
| 2020/0111080 A1* | 4/2020 | Metcalfe | H04L 9/3255 |
| 2020/0126075 A1* | 4/2020 | Fisch | G06F 21/6245 |
| 2020/0126441 A1* | 4/2020 | Garg | H04L 9/3297 |
| 2020/0127835 A1* | 4/2020 | Fletcher | H04L 9/085 |
| 2020/0134205 A1* | 4/2020 | Hsiao | G06F 21/602 |
| 2020/0134719 A1* | 4/2020 | Malik | G06Q 20/3674 |
| 2020/0153640 A1* | 5/2020 | Ranellucci | H04L 9/3255 |
| 2020/0153837 A1* | 5/2020 | Lesimple | H04L 63/1425 |
| 2020/0177394 A1* | 6/2020 | Suzuki | H04L 9/3247 |
| 2020/0202345 A1* | 6/2020 | Zhang | H04L 9/3066 |
| 2020/0213134 A1* | 7/2020 | Zhang | G06Q 20/0655 |
| 2020/0218512 A1* | 7/2020 | Chen | H04L 67/108 |
| 2020/0218984 A1* | 7/2020 | Thornton | G06N 3/088 |
| 2020/0228349 A1* | 7/2020 | Basu | H04L 9/3255 |
| 2020/0244728 A1* | 7/2020 | Jha | H04L 9/30 |
| 2020/0250339 A1* | 8/2020 | Rosedale | G06T 19/006 |
| 2020/0252211 A1* | 8/2020 | Chen | H04L 9/0894 |
| 2020/0264843 A1* | 8/2020 | Schwarz | G06F 7/725 |
| 2020/0264864 A1* | 8/2020 | Yang | H04W 4/40 |
| 2020/0266999 A1* | 8/2020 | Schwarz | H04L 9/3242 |
| 2020/0267000 A1* | 8/2020 | Schwarz | H04L 9/3247 |
| 2020/0267001 A1* | 8/2020 | Schwarz | H04L 9/3033 |
| 2020/0267002 A1* | 8/2020 | Yuan | H04L 9/3255 |
| 2020/0294011 A1* | 9/2020 | Robertson | H04L 9/0637 |
| 2020/0295935 A1* | 9/2020 | Kayan | G06Q 30/0185 |
| 2020/0310875 A1* | 10/2020 | Ragnoli | G06F 9/3877 |
| 2020/0313856 A1* | 10/2020 | Basu | H04L 9/3073 |
| 2020/0320529 A1* | 10/2020 | Lyadvinsky | H04L 9/3239 |
| 2020/0322164 A1* | 10/2020 | Shirai | H04L 9/14 |
| 2020/0322168 A1* | 10/2020 | Su | H04L 9/3255 |
| 2020/0322175 A1* | 10/2020 | Chen | H04L 9/3066 |
| 2020/0349616 A1* | 11/2020 | El Kaafarani | G06Q 30/0282 |
| 2020/0351083 A1* | 11/2020 | Bartolucci | H04L 9/3247 |
| 2020/0353167 A1* | 11/2020 | Vivek | H04L 9/3255 |
| 2020/0366667 A1* | 11/2020 | Cebe | H04L 9/302 |
| 2020/0374114 A1* | 11/2020 | Okano | H04L 9/0819 |
| 2020/0394176 A1* | 12/2020 | Wu | G06F 16/22 |
| 2020/0394177 A1* | 12/2020 | Maurer | G06F 9/45508 |
| 2020/0396072 A1* | 12/2020 | Maurer | G06F 16/2379 |
| 2020/0396212 A1* | 12/2020 | Schiffman | H04L 63/062 |
| 2020/0403776 A1* | 12/2020 | Oh | H04L 9/3247 |
| 2020/0412546 A1* | 12/2020 | Larmuseau | H04L 9/3218 |
| 2020/0412550 A1* | 12/2020 | Zhang | H04L 9/3239 |
| 2021/0006414 A1* | 1/2021 | Sanders | H04L 9/0861 |
| 2021/0037008 A1* | 2/2021 | Swaminath | H04L 9/3255 |
| 2021/0049591 A1* | 2/2021 | Lamesh | H04L 9/3239 |
| 2021/0067345 A1* | 3/2021 | Shamai | H04L 9/085 |
| 2021/0083872 A1* | 3/2021 | Desmarais | H04L 9/0894 |
| 2021/0097528 A1* | 4/2021 | Wang | H04L 9/30 |
| 2021/0099283 A1* | 4/2021 | Schvey | G06F 9/466 |
| 2021/0099312 A1* | 4/2021 | Guo | G06F 16/1837 |
| 2021/0105138 A1* | 4/2021 | Tysor | H04L 9/3066 |
| 2021/0105144 A1* | 4/2021 | Borne-Pons | H04L 9/30 |
| 2021/0111889 A1* | 4/2021 | Higley | H04L 9/0643 |
| 2021/0111902 A1* | 4/2021 | Lee | H04W 12/041 |
| 2021/0117555 A1* | 4/2021 | Bernat | H04L 9/30 |
| 2021/0158342 A1* | 5/2021 | Bartolucci | H04L 9/0863 |
| 2021/0160222 A1* | 5/2021 | Bartolucci | H04L 63/0281 |
| 2021/0174243 A1* | 6/2021 | Angel | H04L 9/083 |
| 2021/0182869 A1* | 6/2021 | Davis | G06Q 20/3827 |
| 2021/0201328 A1* | 7/2021 | Gunther | H04L 9/3073 |
| 2021/0234684 A1* | 7/2021 | Maruyama | H04L 9/3013 |
| 2021/0243020 A1* | 8/2021 | Mukherjee | H04L 9/085 |
| 2021/0243604 A1* | 8/2021 | Lepp | H04W 12/55 |
| 2021/0248675 A1* | 8/2021 | Guo | G06Q 20/10 |
| 2021/0256513 A1* | 8/2021 | Lu | G06Q 20/065 |
| 2021/0273814 A1* | 9/2021 | Lee | G06F 21/33 |
| 2021/0297242 A1* | 9/2021 | Li | H04L 9/3239 |
| 2021/0312431 A1* | 10/2021 | Ravinathan | G06Q 20/3829 |
| 2021/0314161 A1* | 10/2021 | Voit | H04L 9/0869 |
| 2021/0336770 A1* | 10/2021 | Ahmed | H04L 9/085 |
| 2021/0344510 A1* | 11/2021 | Wright | H04L 9/3252 |
| 2021/0383363 A1* | 12/2021 | Smirnov | G06Q 20/3674 |
| 2021/0385069 A1* | 12/2021 | Reid | G06F 21/32 |
| 2021/0391987 A1* | 12/2021 | Badrinarayanan | H04L 9/30 |
| 2021/0406877 A1* | 12/2021 | Wu | G06Q 20/4014 |
| 2022/0021521 A1* | 1/2022 | Shamai | G06Q 20/3676 |
| 2022/0027970 A1* | 1/2022 | Kim | G06Q 30/0613 |
| 2022/0029827 A1* | 1/2022 | Wright | H04L 9/0825 |
| 2022/0052843 A1* | 2/2022 | Carver | G16H 80/00 |
| 2022/0058652 A1* | 2/2022 | Wilson, Jr. | G06Q 20/401 |
| 2022/0076253 A1* | 3/2022 | Chaum | G06Q 20/322 |
| 2022/0078024 A1* | 3/2022 | Misoczki | G06N 10/00 |
| 2022/0092686 A1* | 3/2022 | Sekar | G06Q 40/04 |
| 2022/0094555 A1* | 3/2022 | Roy | G06Q 20/065 |
| 2022/0123929 A1* | 4/2022 | Johnson | H04L 9/0863 |
| 2022/0141014 A1* | 5/2022 | Britto | H04L 9/0637 380/286 |
| 2022/0198444 A1* | 6/2022 | Mee | G06Q 20/389 |
| 2022/0237287 A1* | 7/2022 | Vigilant | G06F 21/554 |
| 2022/0253933 A1* | 8/2022 | Sako | G06Q 20/3825 |
| 2022/0278828 A1* | 9/2022 | Wang | H04L 9/085 |
| 2022/0278854 A1* | 9/2022 | Tobkin | G06Q 20/3825 |
| 2022/0311621 A1* | 9/2022 | Uchida | H04L 9/3236 |
| 2022/0329584 A1* | 10/2022 | Sharma | H04L 9/3263 |
| 2022/0398601 A1* | 12/2022 | Anastas | G06K 19/0723 |
| 2022/0400020 A1* | 12/2022 | Davies | G06F 21/64 |
| 2023/0004946 A1* | 1/2023 | Fujimoto | G06Q 20/02 |
| 2023/0006836 A1* | 1/2023 | Carter | H04L 9/3239 |
| 2023/0043095 A1* | 2/2023 | Milam | H04L 9/3247 |
| 2023/0048174 A1* | 2/2023 | Priisalu | H04L 9/3263 |

(56) References Cited

U.S. PATENT DOCUMENTS

| | | | | |
|---|---|---|---|---|
| 2023/0179409 A1* | 6/2023 | Camenisch | ............ | H04L 9/3247 713/171 |
| 2023/0198758 A1* | 6/2023 | Castelluccia | ..... | H04W 12/0471 713/171 |
| 2023/0231725 A1* | 7/2023 | Ammar | ................. | H04L 9/3247 713/176 |
| 2023/0308299 A1* | 9/2023 | Wattiau | ................. | H04L 9/3247 |
| 2023/0344643 A1* | 10/2023 | Priisalu | ................... | H04L 9/085 |
| 2024/0048393 A1* | 2/2024 | Beckwith | .............. | H04L 9/3093 |
| 2024/0236075 A1* | 7/2024 | Breitner | .............. | H04L 63/0823 |

OTHER PUBLICATIONS

Yang et al "Improvement of an Efficient ID-based RSA Multisignature, 2010 International Conference on Complex, Intelligent and Software Intensive Systems," IEEE Computer Society, pp. 822-826 (Year: 2010).*

Wang et al "A New Type of Digital Multisignature," The 9th International Conference on Computer Supported Cooperative Work in Design Proceedings, pp. 750-754 (Year: 2005).*

Qian et al "Cryptanalysis of Chang-Lin-Lam's ID-based Multisignature Scheme," IEEE Computer Society, pp. 1-4 (Year: 2006).*

Aumasson et al "A Survey of ECDSA Threshold Signing," pp. 1-20 (Year: 2020).*

Google Patents Translation of CN108476139A, pp. 1-15 (Year: 2018).*

Zhang et al "Improving Efficiency of Pseudonym Revocation in VANET Using Cuckoo Filter," 2020 IEEE 20th International Conference on Communication Technology, pp. 763-769 (Year: 2020).*

Ren et al "Multi-User Broadcast Authentication in Wireless Sensor Networks," IEEE, pp. 223-232 (Year: 2007).*

* cited by examiner

ELECTRONIC AUTHENTICATION SYSTEM AND METHOD OF SUPPORTING MULTI-SIGNATURE

CROSS-REFERENCE TO RELATED APPLICATIONS

This application claims priority to and the benefit of Korean Patent Application No. 10-2021-0113306 filed in the Korean Intellectual Property Office on Aug. 26, 2021, the entire contents of which are incorporated herein by reference.

TECHNICAL FIELD

The present invention relates to an electronic authentication system and method supporting multi-signature, and more particularly, to an electronic authentication system and method supporting multi-signature for improving multi-signature verification performance while enhancing security for personal information of users participating in multi-signature.

BACKGROUND ART

In general, multi-signature refers to an electronic signature method in which a plurality of parties performs a signature on one signature target. This multi-signature has higher security than a single-signature method in which a single party performs a signature on a single signature target, but has problems in increasing signature verification time and the amount of data storage.

That is, as disclosed in Korean Patent Nos. 10-1575030 and 10-1849908, since in the existing technology, multi-signature is performed through multiple user terminals, there is a problem in that a lot of time is required for the signature verification performed through the respective user terminals and the amount of data to be stored for signature verification is large.

SUMMARY OF THE INVENTION

The present invention has been made in an effort to provide an electronic authentication system and method for improving multi-signature verification performance and data storage efficiency while enhancing the security of personal information of users participating in multi-signature.

An exemplary embodiment of the present invention provides an electronic authentication method of a server supporting multi-signature, the electronic authentication method including: operation Aa of designating, by the server, a user group including a plurality of users to participate in multi-signature; operation Ab of further including, by the server, a virtual user in the user group according to a predetermined policy or a request of one or two or more users of the plurality of users; operation Ac of generating, by the server, a communication channel for communication with the user group; operation Ad of receiving, by the server, a public key for each user of the user group through the communication channel, and sharing the received public key with the user or virtual user of the user group; and operation Ae of sharing, by the server, a local signature generated by the user of the user group through the communication channel, in which the user of the user group performs multi-signature by using the local signature and a private key for the multi-signature, and generates multi-signer authentication information capable of authenticating validity of the performed multi-signature, and the user or the virtual user of the user group authenticates the validity of the performed multi-signature by using a public key for each user of the user group, a predetermined hash function, and the multi-signer authentication information.

According to the exemplary embodiment, the multi-signer authentication information may be stored as a Bloom filter.

According to the exemplary embodiment, the authentication of the multi-signer authentication information may be performed by requesting, by the user performing the multi-signature, the authentication from the virtual user.

According to the exemplary embodiment, the local signature shared in operation Ae may be a local signature encoded using a time stamp assigned to the user group and a private key fragment included in the private key for the multi-signature of the user performing the multi-signature.

According to the exemplary embodiment, when the multi-signature of the plurality of users is not completed within a predetermined time limit, the virtual user may stop the progress of the corresponding multi-signature.

According to the exemplary embodiment, the virtual user may update and store the multi-signer authentication information or store new multi-signer authentication information by using the public key of the user who has performed the multi-signature within the time limit, a public key of a user who has not performed the multi-signature within the time limit, and the hash function.

Another exemplary embodiment of the present invention provides an electronic authentication method of an electronic terminal supporting multi-signature, the electronic authentication method including: operation Ba of sharing, by the electronic terminal, a public key for each user of a user group including a plurality of users to participate in multi-signature; operation Bb of authenticating, by the electronic terminal, multi-signer authentication information for authenticating validity of the multi-signature by using the shared public key; operation Bc of performing, by the electronic terminal, the multi-signature using a private key for multi-signature, and sharing a local signature generated for the multi-signature; and operation Bd of updating and storing, by the electronic terminal, the multi-signer authentication information or storing new multi-signer authentication information by using the shared public key and a predetermined hash function, in which when a virtual user is included in the user group according to a predetermined policy for the user group or a request from one or two or more users included in the user group, the user or the virtual user of the user group authenticates validity of the multi-signature by using the public key for each user of the user group, the hash function, and the multi-signer authentication information.

According to the exemplary embodiment, the multi-signer authentication information stored in operation Bd may be stored as a Bloom filter.

According to the exemplary embodiment, operation Bc may include, in order to perform the multi-signature, generating a single signature by using a Threshold Elliptic Curve Digital Signature Algorithm (T-ECDSA) method by using a local signature shared by other electronic terminals of the user group and the private key for the multi-signature.

According to the exemplary embodiment, operation Bc may include encoding the local signature by using a time stamp assigned to the user group and a private key fragment included in the private key for the multi-signature before sharing the local signature.

According to the exemplary embodiment, when the multi-signature of the plurality of users is not completed within a predetermined time limit, the virtual user may stop the progress of the corresponding multi-signature.

According to the exemplary embodiment, the virtual user may update and store the multi-signer authentication information or store new multi-signer authentication information by using the public key of the user who has performed the multi-signature within the time limit, a public key of a user who has not performed the multi-signature within the time limit, and the hash function.

According to the exemplary embodiment, operation Bb may include requesting, by the electronic terminal, the authentication from the virtual user and performing the authentication.

The exemplary embodiments according to the present invention may be implemented by using a computer program recorded in a recording medium as a computer program for executing the above-described operation or method through a computer system.

According to the present invention, the security and reliability of multi-signature may be strengthened by performing authentication for multi-signature while storing and managing multi-signer authentication information for authenticating the validity of multi-signature by a trusted virtual user.

In addition, it is possible to prevent personal information leakage and improve multi-signature verification performance and data storage efficiency at the same time by storing and managing multi-signer authentication information by using the Bloom filter having a small data size without storing actual data instead of the user's public key or address.

In addition, it is possible to further improve the multi-signature verification performance by reconstructing the local signatures generated by the multi-signer through the T-ECDSA and finally generating a single signature.

In addition, it is possible to systematically managing the signer by generating information on whether users participating in the multi-signature perform multi-signature when the multi-signature is completed, as well as when the multi-signature procedure is stopped.

In addition, it is possible to apply block chain protocols, such as Bitcoin and Ethereum, or ECDSA without modification, thereby making it easy to build a multi-signature system and reduce the cost of building the system.

Furthermore, those of ordinary skill in the art to which the present invention pertains will clearly understand from the following description that various embodiments according to the present invention can solve various technical problems not mentioned above.

DETAILED DESCRIPTION

Hereinafter, exemplary embodiments according to the present invention will be described in detail with reference to the accompanying drawings in order to clarify solutions corresponding to the technical problems of the present invention. However, in the description of the present invention, if the description of the related known technology rather obscures the gist of the present invention, the description thereof may be omitted. In addition, the terms used in this specification are terms defined in consideration of functions in the present invention, and the terms may vary according to the intentions or customs of designers, manufacturers, and the like. Therefore, definitions of terms to be described below should be made based on the content throughout this specification.

Figure 1:
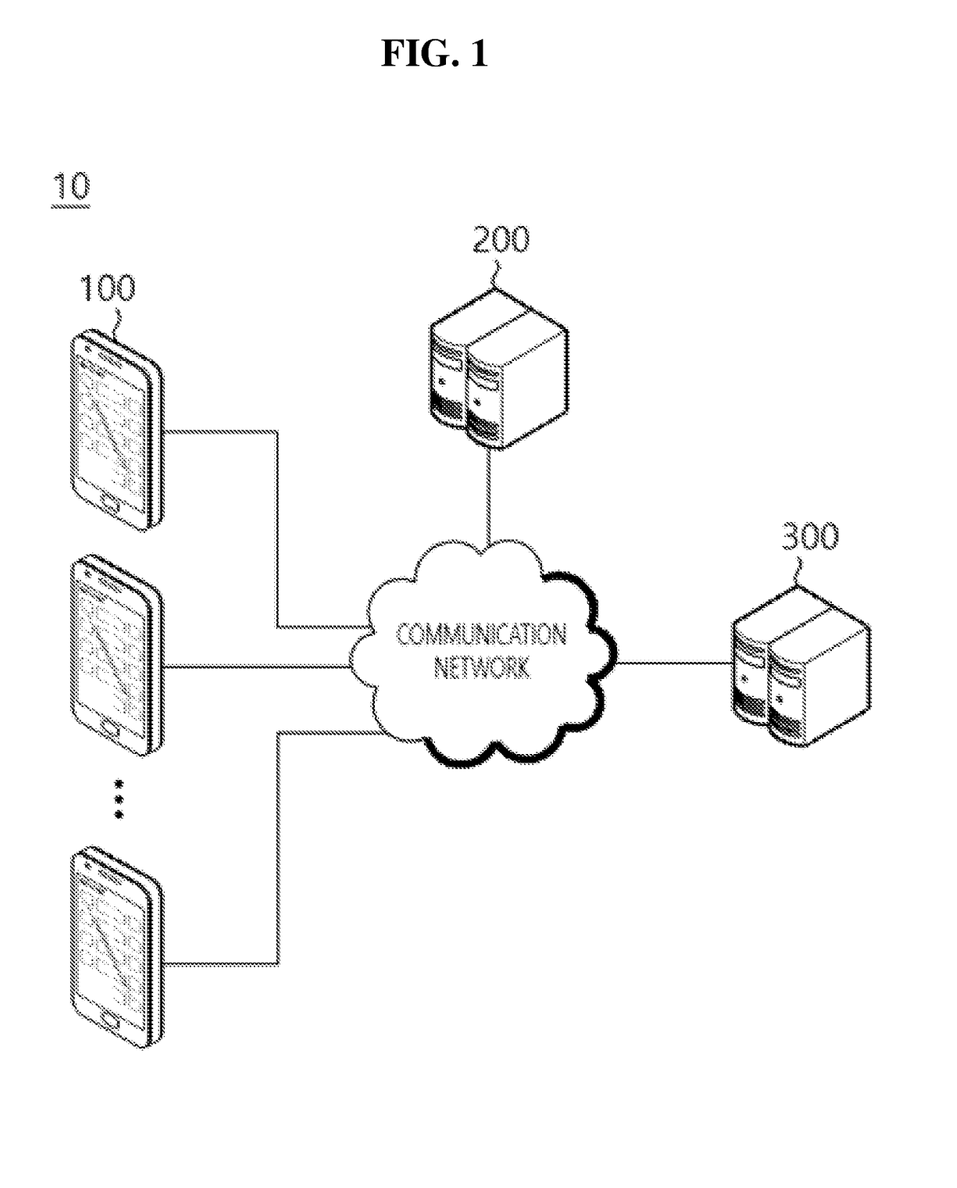
FIG. 1 is a diagram illustrating an electronic authentication system according to an exemplary embodiment of the present invention.

FIG. 1 is a diagram illustrating an electronic authentication system 10 according to an exemplary embodiment of the present invention.

As illustrated in FIG. 1, the electronic authentication system 10 according to the exemplary embodiment of the present invention may include a plurality of authentication terminals 100, an authentication management server 200, and a virtual user server 300.

The authentication terminal 100 is a communication terminal used by a user participating in multi-signature, and may be configured to support generation and management of a private key and a public key of a corresponding user, and to perform an electronic signature. The authentication terminal 100 may be configured as a mobile terminal, such as a smart phone, a tablet PC, a laptop computer, a notebook computer, or the like, or may be configured as a fixed terminal, such as a desktop PC.

The authentication management server 200 is a server that manages a multi-signature procedure and a multi-signature authentication procedure, and may be configured to support exchange of information of each authentication terminal 100, such as a public key and an encoding key, local reconstruction of user signatures, and signature validity verification.

The virtual user server 300 may be configured to participate in a multi-signature procedure and an authentication procedure as a virtual user to be delegated the authority of users who are to actually perform multi-signature. That is, the virtual user server 300 may be configured to authenticate the validity of multi-signature on behalf of real users or to stop the multi-signature procedure according to specific conditions. To this end, the virtual user server 300 may operate as a kind of terminal with respect to the authentication management server 200. The virtual user server 300 may be operated by a public trustworthy institution or company.

Figure 2:
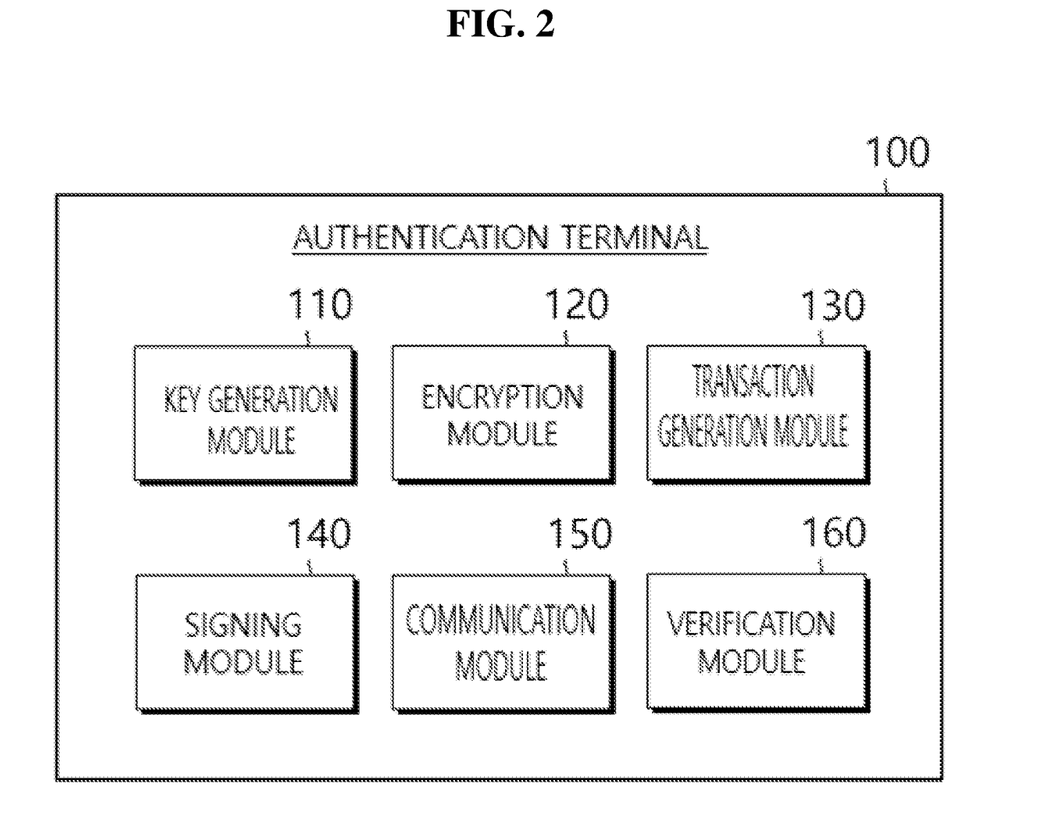
FIG. 2 is a diagram illustrating an authentication terminal of the electronic authentication system according to the exemplary embodiment of the present invention.

FIG. 2 is a diagram illustrating an authentication terminal 100 of the electronic authentication system according to the exemplary embodiment of the present invention.

As illustrated in FIG. 2, the authentication terminal 100 may be configured to support private key/public key management and to perform multiple signatures on a signature target, such as a transaction. To this end, the authentication terminal 100 may include a key generation module 110, an encryption module 120, a transaction generation module 130, a signing module 140, a communication module 150, a verification module 160, and the like.

The key generation module 110 may be configured to generate a private key and a public key of a user who uses the corresponding authentication terminal 100. In addition, the key generation module 110 may be configured to generate a common public key by recombining of public keys of all users participating in the multi-signature. As will be described again below, the key generation module 110 may be configured to further generate a private key for multi-signature, an encoding key, a decoding key, and the like in addition to the private key of the user.

The encryption module 120 may be configured to encode the corresponding information or to decode the encoded information so that the specific information is not exposed according to the progress of the multi-signature procedure and the authentication procedure.

The transaction generation module 130 may be configured to generate a transaction of a block chain, such as Bitcoin or Ethereum. As will be described again below, the transaction generation module 130 may be configured to store a Bloom-filter for authenticating the validity of the multi-signature in a transaction.

The signing module 140 is configured to generate a user's local signature for multi-signature and to generate a single signature by reconstructing local signatures for each user of a user group to participate in the multi-signature, to perform multi-signature on a signature target. In this case, the signing module 140 may be configured to generate a single signature by reconstructing local signatures for each user through Threshold Elliptic Curve Digital Signature Algorithm (T-ECDSA).

The communication module 150 may be configured to perform data communication with the authentication management server 200, other authentication terminals, or the virtual user server 300 through a communication channel provided by the authentication management server 200, and transmit and receives data or information.

The verification module 160 may be configured to verify whether the information of the authentication terminal 100 is forged. When the corresponding information is forged, the verification module 160 is configured to stop the multi-signature process. That is, the verification module 160 may be configured to generate and store multi-signer authentication information by using the Bloom filter, which will be described below, and to authenticate the validity of the multi-signature through the stored multi-signer authentication information.

As will be described again below, the multi-signer authentication information may include a plurality of hash values calculated by inputting the public key of the user who has performed the multi-signature into each of a plurality of different hash functions, or a bit string value of a binary number generated by mapping each of the plurality of calculated hash values with a specific bit in a predetermined bit string and setting the value of the mapped bit to 1 and setting the value of the unmapped bit to 0. The multi-signer authentication information may be generated and stored by the Bloom-filter which calculates a plurality of hash values by inputting the public key of the user who has performed the multi-signature into a plurality of different hash functions, and sets a bit value of a position corresponding to each of the plurality of hash values among bits of a predetermined bit string to a value of 1. The verification module 160 may be configured to authenticate the validity of the multi-signature or the validity of the multi-signer authentication information through the Bloom-filter.

According to the exemplary embodiment, the verification module 160 may also be configured to request the virtual user to authenticate the validity of the multi-signature or multi-signer authentication information, and to perform the corresponding authentication through the virtual user.

Figure 3:
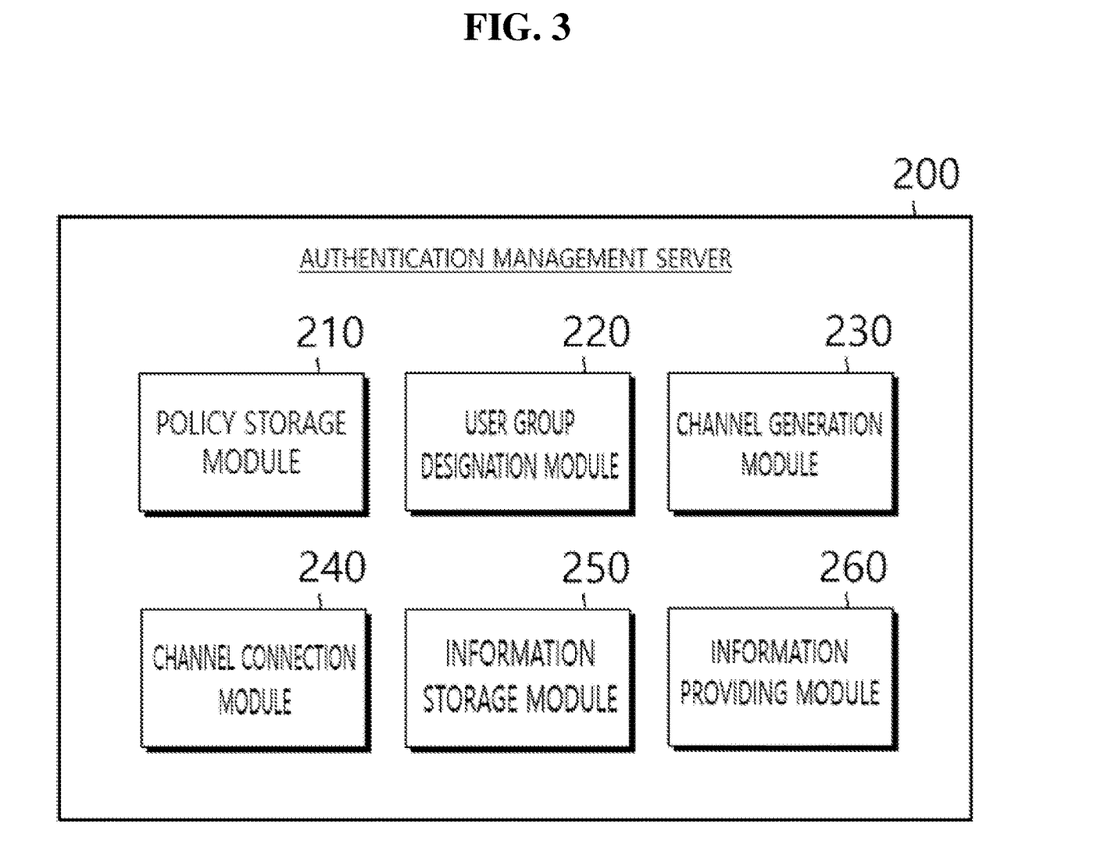
FIG. 3 is a diagram illustrating an authentication management server of the electronic authentication system according to the exemplary embodiment of the present invention.

FIG. 3 is a diagram illustrating the authentication management server 200 of the electronic authentication system according to the exemplary embodiment of the present invention.

As illustrated in FIG. 3, the authentication management server 200 may be configured to support exchange of information, such as the public key and the encoding key, of each authentication terminal 100, local reconstruction of a user's signature, signature validity verification, and the like. To this end, the authentication management server 200 may include a policy storage module 210, a user group designation module 220, a channel generation module 230, a channel connection module 240, an information storage module 250, and an information providing module. 260.

The policy storage module 210 may be configured to store and manage various policies, such as a multi-signature policy, a policy related to authentication required for a multi-signature procedure, a multi-signature time limit, and the number of multi-signers required for each signature target, applied to the electronic authentication system 10.

The user group designation module 220 may be configured to designate a user group including a plurality of users to participate in multi-signature according to a type of a signature target or the policy stored in the policy storage module 210. In addition, the user group designation module 220 may be configured to further include a virtual user in the user group according to a predetermined policy or a request of one or two or more of the plurality of users. As described above, the virtual user may be configured to have an authentication authority in the multi-signature procedure and an authority to stop the multi-signature process according to circumstances.

The channel generation module 230 may be configured to generate a communication channel for communication between authentication terminals or between the authentication terminals and the virtual user server 300 serving as a virtual user. As a result, the authentication terminals and the virtual user server 300 may perform a pre-processing operation for safe information exchange, such as exchanging the encoding keys with each other, through the communication channel before performing the multi-signature.

The channel connection module 240 connects the authentication terminals and the virtual user server 300 to the generated communication channel to make it possible to exchange information or share information between the authentication terminals or between the authentication terminals and the virtual user server 300. For example, authentication terminals may generate a common public key of a multi-signature wallet through the communication channel. In this case, the common public key may be used as a representative address of the multi-signature wallet. These addresses may be used to send and receive digital assets on the blockchain network.

Meanwhile, the information storage module 250 may be configured to store information generated by each authentication terminal 100 or the virtual user server 300 in the authentication management server 200. All information stored in the authentication management server 200 may be encrypted to protect the corresponding information from a malicious server manager.

The information providing module 260 may be configured to transmit user information stored in the information storage module 250 to the authentication terminals or the virtual user server 300. For example, the information storage module 250 may store and manage the public keys or the encoding keys of the user, and the like. In this case, each authentication terminal 100 may request a public key or encoding key of a specific user from the information providing module 260, and the information providing module 260 may receive the requested key from the information storage module 250 and provide the received key to the corresponding authentication terminal 100.

For reference, the encoding key may be used to encrypt information required for the multi-signature for high security. In order to verify that the corresponding encoding key is correct, zero-knowledge proof that is a method capable of verifying data without revealing the data may be used. When the proof is not valid, the key generation process or the signing process may be stopped.

Figure 4:
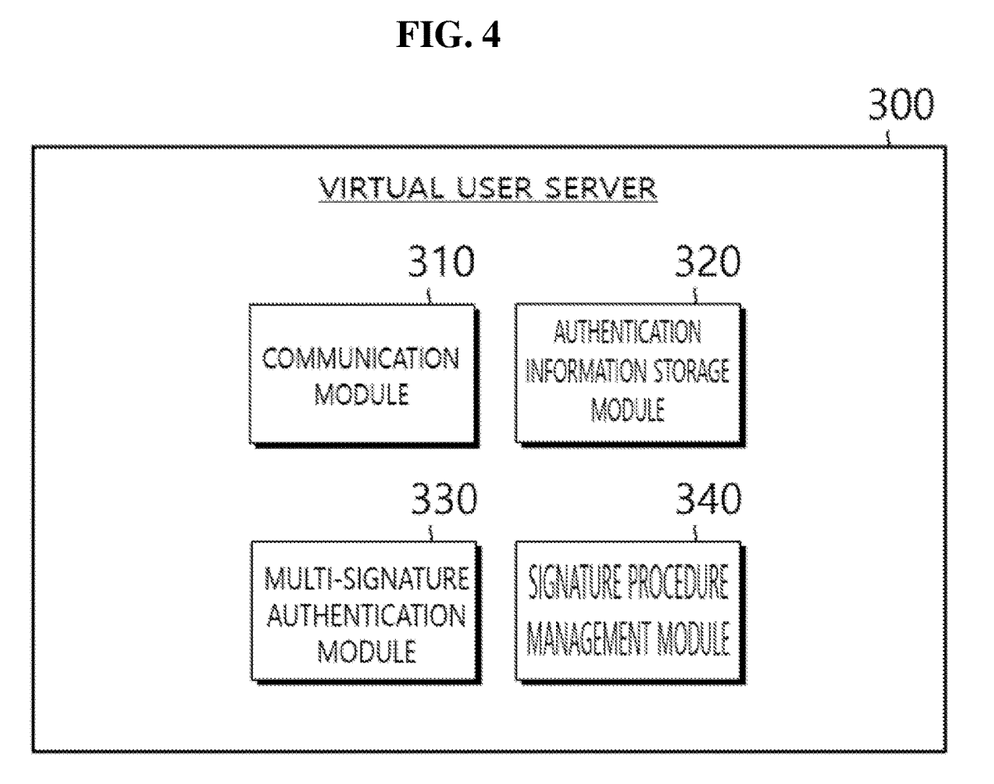
FIG. 4 is a diagram illustrating a virtual user server of the electronic authentication system according to the exemplary embodiment of the present invention.

FIG. 4 is a diagram illustrating the virtual user server 300 of the electronic authentication system according to the exemplary embodiment of the present invention.

As illustrated in FIG. 4, the virtual user server 300 may be configured to support authentication of validity of the multi-signature, stop of multi-signature procedures, and the like. To this end, the virtual user server 300 may include a communication module 310, an authentication information storage module 320, a multi-signature authentication module 330, and a signature procedure management module 340.

The communication module 310 may be configured to perform data communication with the authentication management server 200 or the authentication terminals through the communication channel provided by the authentication management server 200, and to transmit and receive data or information.

The authentication information storage module 320 may be configured to store the public keys of the users transmitted from the authentication terminals, the Bloom-filter that stores the multi-signer authentication information, the hash function set used in the Bloom filter, and the signature time limit information specified by the authentication management server 200.

The multi-signature authentication module 330 may be configured to generate and store multi-signer authentication information for authenticating the validity of the multi-signature when a user who has performed multi-signature occurs, compare the value of the multi-signer authentication information with a value generated by using the public key shared in the user group and the predetermined hash function, and authenticate the validity of the multi-signer authentication information or the validity of the corresponding multi-signature. The multi-signer authentication information may be generated and stored by using the Bloom filter.

As described above, the multi-signer authentication information may include a plurality of hash values calculated by inputting the public key of the user who has performed the multi-signature into each of a plurality of different hash functions, or a bit string value of a binary number generated by mapping each of the plurality of calculated hash values with a specific bit in a predetermined bit string and setting the value of the mapped bit to 1 and setting the value of the unmapped bit to 0. The multi-signer authentication information may be generated and stored by the Bloom-filter which calculates a plurality of hash values by inputting the public key of the user who has performed the multi-signature into a plurality of different hash functions, and sets a bit value of a position corresponding to each of the plurality of hash values among bits of a predetermined bit string to a value of 1.

The multi-signature authentication module 330 may be configured to authenticate the validity of the multi-signature or the validity of the multi-signer authentication information through the Bloom-filter.

In addition, when the multi-signature procedure is stopped due to the occurrence of a specific event, the multi-signature authentication module 330 may update and store the multi-signer authentication information by using the public key of the user who has performed the multi-signature before stopping the multi-signature procedure, a public key of a user who has not performed the multi-signature, and the predetermined hash function, or generate and store new multi-signer authentication information.

The signature procedure management module 340 may be configured to monitor the progress of the multi-signature procedure, and to stop the corresponding multi-signature procedure when the authentication of the validity of multi-signature or the authentication of the validity of the multi-signer authentication information fails, or when the multi-signature procedure is not completed within a predetermined time limit.

Figure 5:
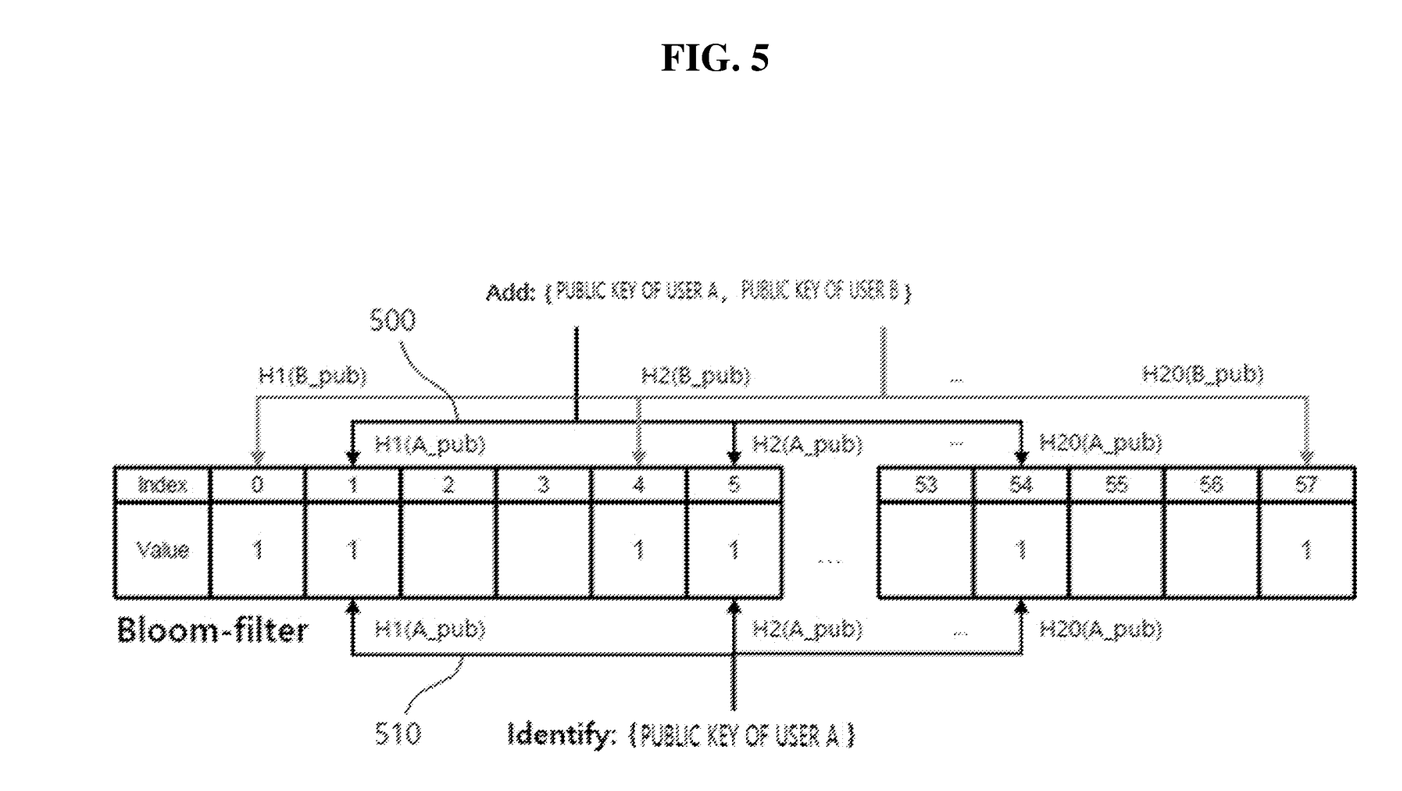
FIG. 5 is a diagram illustrating an example of a Bloom filter for storing multi-signer authentication information.

FIG. 5 is a diagram illustrating an example of the Bloom filter for storing the multi-signer authentication information.

As illustrated in FIG. 5, in order to authenticate the validity of the multi-signature or to authenticate the validity of the multi-signer authentication information, the verification module 160 of the authentication terminal 100 or the multi-signature authentication module 330 of the virtual user server 300 may generate and store multi-signer authentication information by using the Bloom filter.

The Bloom filter corresponds to a space-efficient probabilistic data structure and may be used to check whether a specific element is a member of a set. The Bloom filter is composed of a bit string structure of m bit size, and may use k different hash functions. The size of the Bloom filter may be determined by using Equation 1 with an m-bit size bit string and k hash functions.

$$m = \mathrm{ceil}((N*\log(P))/\log(1/\mathrm{pow}(2, \log(2))))$$

$$k = \mathrm{round}((m/N)*\log(2))| \qquad \text{[Equation 1]}$$

In Equation 1, m is the number of bits of the Bloom filter, k is the number of hash functions used in the Bloom filter, N is the maximum number of items added to the filter, and P is the probability of false-positive.

The Bloom filter includes two processes. First, an element is added to the filter and whether the corresponding element is included in the set is validated. In order to add the element, the Bloom filter obtains k array positions by using k hash functions.

Next, the Bloom filter sets the bit values of all the positions to 1 in an array of m bit size. In order to check whether the element is in the set, the Bloom filter obtains k array positions by using each of the k hash functions. If the bit at the corresponding position is 0, this means that the element is definitely not in the set. On the other hand, when the bit at the corresponding position is 1, this means that the element is probably in the set.

In the present invention, the Bloom filter is used to authenticate the validity of the multi-signature. By storing the Bloom filter on the blockchain instead of the information (public key or address) of the user, it is possible to provide higher reliability and reduce the transaction size.

By applying the determined number of participants and the false positive probability to Equation 1, it is possible to calculate the bit size of the Bloom filter and the number of hash functions used to generate the Bloom filter.

If the probabilistically safe state is set to $2^{-20}$ and the maximum number of participants in the transaction is set to 10, the Bloom filter has a size from 29 bits that is the optimal number of Bloom filters up to a maximum of 289 bits and 20 hash functions.

As illustrated in FIG. 5, when each authentication terminal calculates the bit size by the number of users (that is, 2), the size of the Bloom filter is 58 bits. Next, each authentication terminal calculates its 20 hash values (H1 to H20) with each user's public key (that is, A_pub and B_pub) and sets a value of a bit corresponding to each hash value to 1 (500). Each authentication terminal may exchange and verify the generated Bloom filter by using a commitment scheme.

For example, in order to check whether user A has performed multi-signature, all authentication terminals calculate each of 20 hash values (H1 to H20) with the public key of user A shared in advance. Then, the value of the bit corresponding to each hash value is checked (510). If all of the checked values are 1, this indicates that user A has performed the multi-signature. This process may be performed in the same way for user B. After authenticating that all users (users A and B) have participated in the multi-signature process through the Bloom filter, the authentication terminal may store the Bloom filter. When the verification of the validity fails, the multi-signature process may be stopped.

Meanwhile, although it is illustrated in FIG. 5 that the Bloom filter includes one bit string, but according to the exemplary embodiment, the Bloom filter may include a plurality of bit strings corresponding to the number of users to participate in multi-signature. In this case, each bit string may be configured to store multi-signer authentication information about any one of the users to participate in the multi-signature.

In this way, the authentication terminals may perform the multi-signature process after generating the Bloom filter. In the present invention, in order to ensure high security, a signature authority may be distributed by using Threshold Elliptic Curve Digital Signature Algorithm (T-ECDSA). The T-ECDSA uses Multi-party Computation (MPC). This is a method of generating a single signature by distributing the authority to multiple authentication terminals. In this process, each authentication terminal may generate random numbers and local signatures in order to distribute the authority and hide information.

Figure 6:
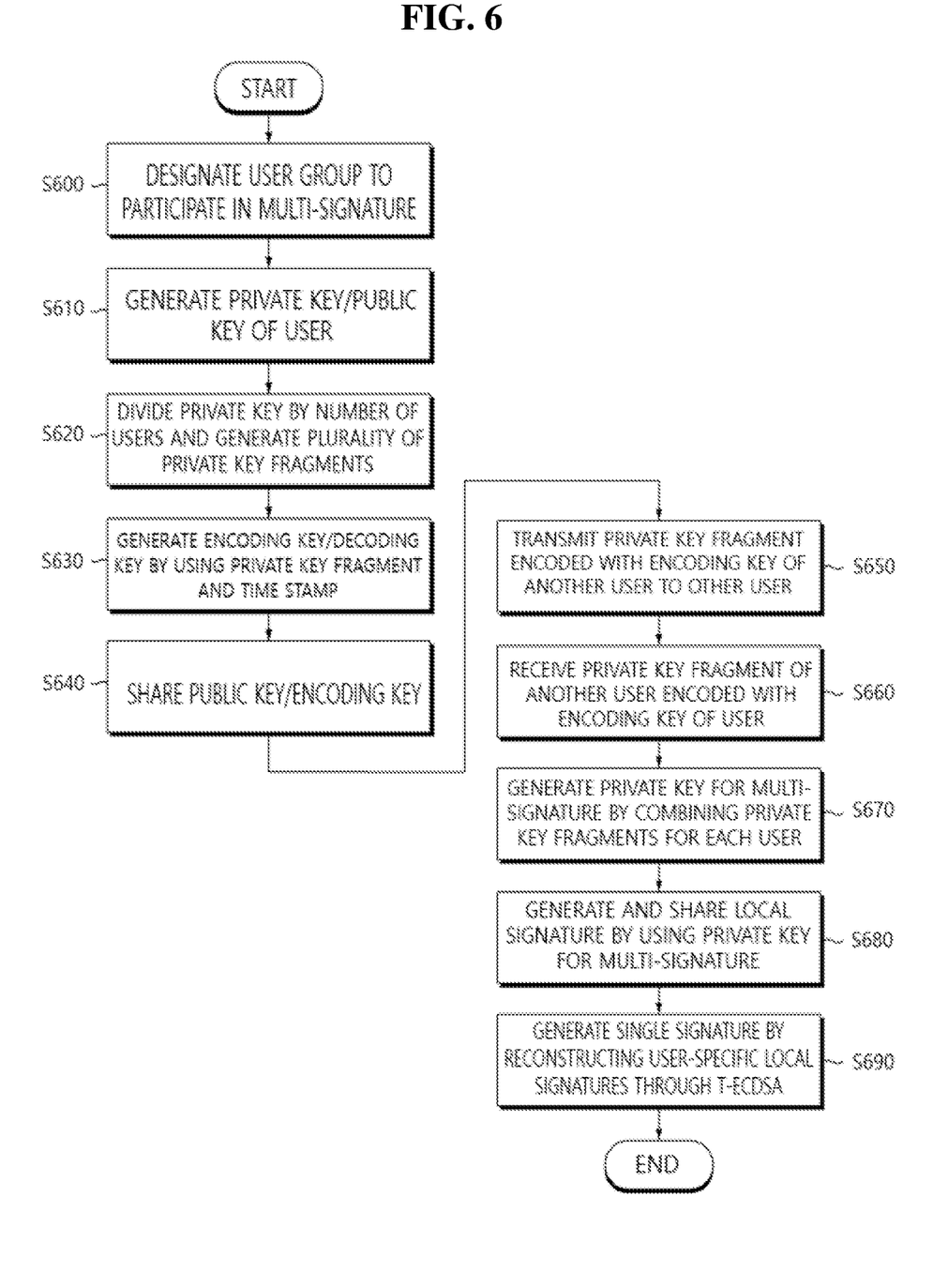
FIG. 6 is a flowchart illustrating a multi-signature process of an electronic authentication method according to an exemplary embodiment of the present invention.

FIG. 6 is a flowchart illustrating a multi-signature process of an electronic authentication method according to an exemplary embodiment of the present invention. Detailed operations of the above-described electronic authentication system 10 will be described in time series with reference to FIG. 6.

As illustrated in FIG. 6, when a user group including a plurality of users to participate in a multi-signature procedure is designated by the authentication management server 200, the authentication terminal 100 of the user included in the user group may generate a private key and a public key of the corresponding user (S610).

In this case, the authentication management server 200 may further include a virtual user in the user group according to a predetermined policy or a request of one or two or more of the plurality of users. Also, the authentication management server 200 may allocate a time stamp to the user group and transmit the allocated time stamp to each authentication terminal.

Then, the authentication terminal 100 of each of the plurality of users may generate a plurality of private key fragments by dividing the private key of the corresponding user into the number corresponding to the plurality of users (S620).

Then, each authentication terminal 100 may generate an encoding key and a decoding key of the corresponding user by using one private key fragment among the plurality of private key fragments and a time stamp allocated by the authentication management server 200 (S630).

Next, each authentication terminal 100 may share the public key and the encoding key with other authentication terminals (S640). In this case, each authentication terminal 100 may distribute the public key and the encoding key of the corresponding user to other authentication terminals through the authentication management server 200.

Then, each authentication terminal 100 may retain one of the plurality of private key fragments, and encode each of the rest private key fragments with the encoding keys of other users to distribute the encoded private key fragment to the other corresponding user (S650). For example, the authentication terminal of user A encodes the private key fragment of user A with the encoding key of user B and transmits the encoded private key fragment to user B through the authentication management server 200, but may encode another private key fragment of user A with the encoding key of user C and transmit the encoded private key fragment to user C through the authentication management server 200.

Then, each authentication terminal 100 may receive the other user's private key fragments encrypted with the encoding key of the corresponding user (S660). For example, user A may receive a user B's private key fragment and a user C's private key fragment each encoded with the user A's encoding key. In this case, user A may decode the received private key fragments with his/her own decoding key that is being stored.

Then, each authentication terminal 100 may generate a private key for multi-signature by combining the user-specific private key fragments (S670).

Then, each authentication terminal 100 may generate a local signature by using the multi-signature private key, and share the generated local signature with other authentication terminals through the authentication management server 200 (S680).

Then, each authentication terminal 100 may generate a single signature by reconstructing the shared user-specific local signatures through the Threshold Elliptic Curve Digital Signature Algorithm (T-ECDSA) (S690).

In this case, each authentication terminal 100 may encode the generated local signature with an encoding key generated with the time stamp and the one private key fragment, and share the encoded local signature.

Meanwhile, t of T-ECDSA is defined as a threshold value at which t+1 users complete multi-signature. In T-ECDSA, t+1 multi-user local signature is performed, and a single signature is generated by using local signatures that are encoded and shared for each user. For the generated single signature, the validity of the signature may be validated with the common public key. ECDSA, which is the basis of T-ECDSA, may be expressed as in Equation 2.

$$Pxy = k \cdot G, r = Px \bmod n$$

$$s = k-1(z + rpk) \bmod n \qquad \text{[Equation 2]}$$

In Equation 2, Pxy is a point on the elliptic curve, G is a generation point of the elliptic curve, Px is the x-coordinate of the point P, n is the degree of G, r is the signature (the remainder of dividing the value of Px by n), s is the signature value, k is a random number used to obtain the signature r, z is the hash value of the signature target, and Pk is the private key.

Figure 7:
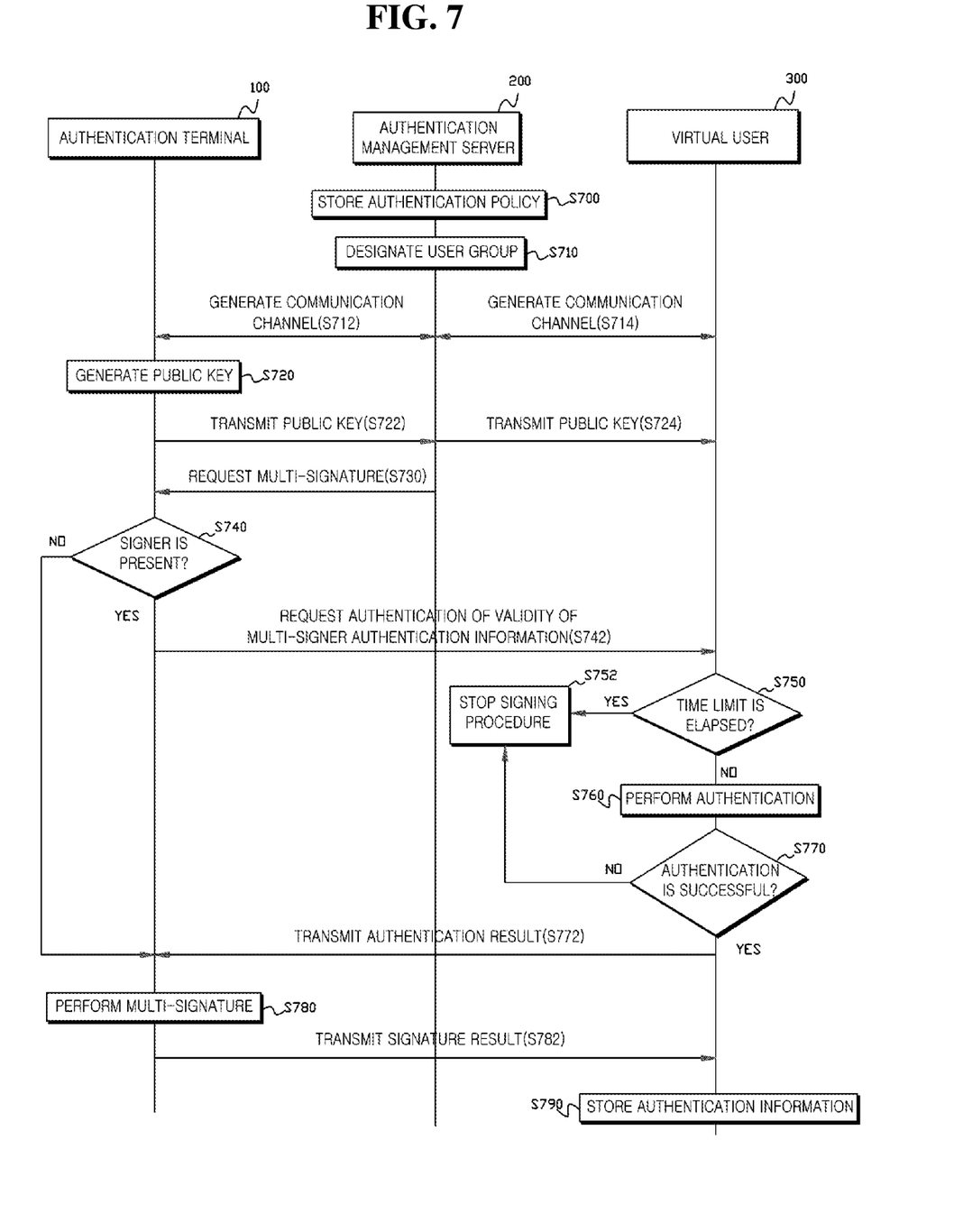
FIG. 7 is a flowchart illustrating a multi-signature authentication process of the electronic authentication method according to the exemplary embodiment of the present invention.

FIG. 7 is a flowchart illustrating a multi-signature authentication process of the electronic authentication method according to the exemplary embodiment of the present invention. Detailed operations of the above-described electronic authentication system 10 will be described in time series with reference to FIG. 7.

As illustrated in FIG. 7, the authentication management server 200 may store and manage various policies, such as a multi-signature authentication policy, a signature time limit, and the number of multiple signers required for a signature target in advance (S700).

Next, the authentication management server 200 may designate a user group including a plurality of users to participate in multi-signature (S710). In this case, the authentication management server 200 may further include a virtual user in the user group according to a predetermined policy or a request of one or two or more users among a plurality of users.

Then, the authentication management server 200 may generate a communication channel for communication with the user group (S712, S714).

Then, the authentication terminal 100 may generate a public key of the corresponding user (S720), and may share the public key with the remaining users or the virtual user included in the user group (S722, S724). In this case, the authentication management server 200 receives each user-specific public key from the authentication terminals of the user group through the communication channel and distributes the received public key to the entire user group or virtual user, thereby allowing the users or virtual users of the user group to share the corresponding public keys.

Then, when the authentication management server 200 requests the authentication terminal 100 to perform multi-signature, the authentication terminal 100 generates a private key for multi-signature as illustrated in FIG. 6 and proceeds with a multi-signature process (S730).

When there is another user who has already performed the multi-signature, and multi-signer authentication information for authenticating the validity of the multi-signature is generated and stored (S740), the authentication terminal 100 may request the authentication of validity of the corresponding multi-signer authentication information from the virtual user 300 (S742). In this case, the virtual user 300 may be implemented through a separate server or computer device distinct from the authentication management server 200. According to the exemplary embodiment, the authentication terminal 100 may be configured to directly perform the authentication of the validity of the multi-signer authentication information.

Then, when the predetermined signature time limit has elapsed, the virtual user 300 may stop the corresponding multi-signature procedure (S752). In this case, the virtual user 300 may update and store the multi-signer authentication information, or generate and store new multi-signer authentication information by using the public key of the user who has performed the multi-signature among the previously shared public keys, a public key of a user who has not performed the multi-signature, and a predetermined hash function. In this case, the multi-signer authentication information or the new multi-signer authentication information may be stored as a Bloom filter as described above. In this case, a bit indicating whether the signature is performed may be added to the bit string of the Bloom filter.

On the other hand, when the signature time limit has not elapsed, the virtual user 300 may generate new multi-signer authentication information by using the public key of another user who has performed the multi-signature and the predetermined hash function, and authenticate the validity of pre-stored multi-signer authentication information by comparing the generated multi-signer authentication information with the pre-stored multi-signer authentication information to authenticate the validity of the multi-signature performed by the other user (S760). In this case, each multi-signer authentication information may include a Bloom filter value.

When the authentication of the validity of the multi-signer authentication information fails (S770), the corresponding multi-signature procedure may be stopped (S752). On the other hand, when the authentication of the validity of the multi-signer authentication information is successful, the authentication terminal 100 may continue the multi-signature procedure (S780).

When the multi-signature is completed, the authentication terminal 100 may transmit a multi-signature result including the public key of the corresponding user to the virtual user 300 (S782).

Then, the virtual user 300 may update and store the existing multi-signer authentication information or generate and store new multi-signer authentication information by using the transmitted public key and the predetermined hash function (S790). As mentioned above, the corresponding multi-signer authentication information may be stored as the Bloom filter.

Meanwhile, the exemplary embodiments according to the present invention may be implemented as a computer system and a computer program for driving the computer system. When the exemplary embodiments of the present invention are implemented as a computer program, the constituent elements of the present invention may include program segments that execute corresponding operations or tasks through a corresponding computer system. The computer programs or program segments may be stored in various computer-readable recording media. The computer-readable recording medium may include any type of medium for recording data readable by a computer system. For example, the computer-readable recording medium may include a ROM, a RAM, an EEPROM, registers, a flash memory, a CD-ROM, a magnetic tape, a hard disk, a floppy disk, or an optical data recording device. In addition, such a recording medium may be distributed in various network-connected computer systems to store or execute program codes in a distributed manner.

As described above, according to the present invention, the security and reliability of multi-signature may be strengthened by performing authentication for multi-signature while storing and managing multi-signer authentication information for authenticating the validity of multi-signature by a trusted virtual user.

In addition, it is possible to prevent personal information leakage and improve multi-signature verification performance and data storage efficiency at the same time by storing and managing multi-signer authentication information by using the Bloom filter having a small data size without storing actual data instead of the user's public key or address.

In addition, it is possible to further improve the multi-signature verification performance by reconstructing the local signatures generated by the multi-signer through the T-ECDSA and finally generating a single signature.

In addition, it is possible to systematically managing the signer by generating information on whether users participating in the multi-signature perform multi-signature when the multi-signature is completed, as well as when the multi-signature procedure is stopped.

In addition, it is possible to apply block chain protocols, such as Bitcoin and Ethereum, or ECDSA without modification, thereby making it easy to build a multi-signature system and reduce the cost of building the system.

Furthermore, it is a matter of course that the exemplary embodiments according to the present invention may solve various technical problems other than those mentioned in this specification in the relevant technical field as well as the related technical field.

So far, the present invention has been described with reference to the specific exemplary embodiments. However, those skilled in the art will clearly understand that various modified exemplary embodiments may be implemented within the technical scope of the present invention. Therefore, the exemplary embodiments disclosed above should be considered in an illustrative point of view, rather than a restrictive point of view. That is, the scope of the true technical spirit of the present invention is indicated in the claims, and all differences within the scope of equivalents thereto should be construed as being included in the present invention.

What is claimed is:

1. An electronic authentication method of a server supporting a multi-signature authentication, the electronic authentication method comprising:
    designating, by the server, a user group including a plurality of users to participate in the multi-signature authentication;
    designating, by the server, a virtual user in the user group according to a predetermined policy or a request of one or two or more users of the plurality of users;
    generating, by the server, a communication channel for communication with the user group;
    receiving, by the server, from a respective electronic terminal of a respective user of the plurality of users of the user group, a respective public key for the respective user of the plurality of users of the user group, through the communication channel;
    sharing the received public keys with electronic terminals of the plurality of users of the user group, including the virtual user;
    generating a private key fragment by dividing a private key of the user into a number corresponding to a number of the plurality of users of the user group;
    encoding a local signature generated by the user of the user group by using a time stamp assigned to the user group and also using the private key fragment;
    sharing, by the server, the local signature generated by the user of the user group, with the electronic terminals of the plurality of users of the user group, through the communication channel;
    performing the multi-signature authentication by using the local signature and the private key for the multi-signature authentication;
    generating multi-signer authentication information capable of authenticating validity of the performed multi-signature authentication; and
    authenticating the validity of the performed multi-signature authentication by using the public key, a predetermined hash function, and the multi-signer authentication information,
    wherein when the multi-signature authentication is not completed within a predetermined time limit, stopping a progress of the multi-signature authentication; and storing new multi-signer authentication information by using the public key of the user who has performed the multi-signature within the time limit, the public key of the user who has not performed the multi-signature within the time limit, and the predetermined hash function.

2. The electronic authentication method of claim 1, wherein the multi-signer authentication information is stored as a Bloom filter.

3. The electronic authentication method of claim 2, wherein the Bloom filter is composed of a bit string structure of m bit size and uses k different hash functions,
    wherein a size of the Bloom filter is determined by using Equation 1:

$$m = \text{ceil}((N^*\log(P))/\log(1/\text{pow}(2, \log(2))))$$

$$k = \text{round}((m/N)^*\log(2)), \qquad \text{[Equation 1]}$$

where m is a number of bits of the Bloom filter, k is a number of hash functions used in the Bloom filter, N is a maximum number of items added to the Bloom filter, and P is probability of false-positive, and
    wherein the authenticating comprises:
    calculating each hash value of the predetermined hash function with the public key, checking whether a value of a bit corresponding to each hash value of the predetermined hash function, if all of checked values are 1, determining that the performed multi-signature authentication is valid, and storing the Bloom filter.

4. The electronic authentication method of claim 1, wherein the authentication of the multi-signer authentication information is performed by requesting, by the user performing the multi-signature authentication, the authentication from the virtual user.

5. The electronic authentication method of claim 1, wherein the performing the multi-signature comprises: generating a single signature by using a Threshold Elliptic Curve Digital Signature Algorithm (T-ECDSA) method by using a local signature shared by other electronic terminals of the user group and the private key for the multi-signature.

6. The electronic authentication method of claim 5, wherein t of the T-ECDSA method is defined as a threshold value at which t+1 users complete multi-signature,
    wherein in the T-ECDSA method, t+1 multi-user local signature is performed, and a single signature is generated by using local signatures that are encoded and shared for each user,
    wherein for the generated single signature, the validity of the signature is validated with the public key, and an Elliptic Curve Digital Signature Algorithm (ECDSA) is expressed as in Equation 2:

$$Pxy = k \cdot G, r = Px \bmod n$$

$$s = k-1(z + rpk) \bmod n, \qquad \text{[Equation 2]}$$

where Pxy is a point P on an elliptic curve, G is a generation point of the elliptic curve, Px is an x-coordinate of the point P, n is a degree of the G, r is a signature (a remainder of dividing the value of the Px by the n), s is a signature value, k is a random number used to obtain the signature r, z is a hash value of a signature target, and Pk is the private key.

7. The electronic authentication method of claim 1, wherein the authenticating comprises:
   requesting, by one or more of the electronic terminals, the authentication from the virtual user and performing the authentication.

\* \* \* \* \*